United States Patent
Nagasaka et al.

[11] Patent Number: 5,804,718
[45] Date of Patent: Sep. 8, 1998

[54] AIRFLOW METER HAVING AN INVERTED U-SHAPE BYPASS PASSAGE

[75] Inventors: Ryo Nagasaka, Nagoya; Yasushi Kohno, Kariya; Masaaki Konishi; Minoru Kondo, both of Chiryu; Katsumi Nakashima, Okazaki, all of Japan

[73] Assignee: Denso Corporation, Kariya, Japan

[21] Appl. No.: 844,779

[22] Filed: Apr. 22, 1997

[30] Foreign Application Priority Data

Apr. 24, 1996 [JP] Japan ................................. 8-101776
Apr. 25, 1996 [JP] Japan ................................. 8-103028

[51] Int. Cl.⁶ ......................................................... G01F 5/00
[52] U.S. Cl. ............................................. 73/202; 73/118.2
[58] Field of Search ................................. 73/202, 204.11, 73/118.2, 204.22

[56] References Cited

U.S. PATENT DOCUMENTS

| | | | |
|---|---|---|---|
| 3,557,482 | 2/1971 | Baker et al. | 73/204 |
| 4,571,996 | 2/1986 | Wakeman et al. | |
| 5,467,648 | 11/1995 | Igarashi et al. | 73/202 |
| 5,537,870 | 7/1996 | Zurek et al. | 73/202 |
| 5,571,964 | 11/1996 | Sawada et al. | 73/202 |

FOREIGN PATENT DOCUMENTS

| | | |
|---|---|---|
| 0025149 A2 | 3/1981 | European Pat. Off. . |
| 0082484 A2 | 6/1983 | European Pat. Off. . |
| 0218216 | 4/1987 | European Pat. Off. . |

*Primary Examiner*—George M. Dombroske
*Assistant Examiner*—Jewel Thompson
*Attorney, Agent, or Firm*—Nixon & Vanderhye P.C.

[57] ABSTRACT

An airflow amount measuring body is formed such that two pipes are arranged in parallel and a bypass passage having an inverted U-shape is provided. The passage sectional areas A1, A2 and A3 of an upstream side passage, a turning section and a downstream passage of the bypass passage are set as A1<A2 and A1<A3, more preferably $A2/A1 \geq 1.14$ and $A3/A1 \geq 1.20$ to suppress contraction flow. A venturi tube section is provided at the lower end of the flow amount measuring body at the peripheral wall of the venturi tube section at the downstream side. A passage enlarging section is provided at the part of the peripheral walls of the venturi tube section at the downstream side where the bypass flow joins, and a guide section for guiding the bypass flow is provided at an outflow port of the bypass passage.

16 Claims, 10 Drawing Sheets

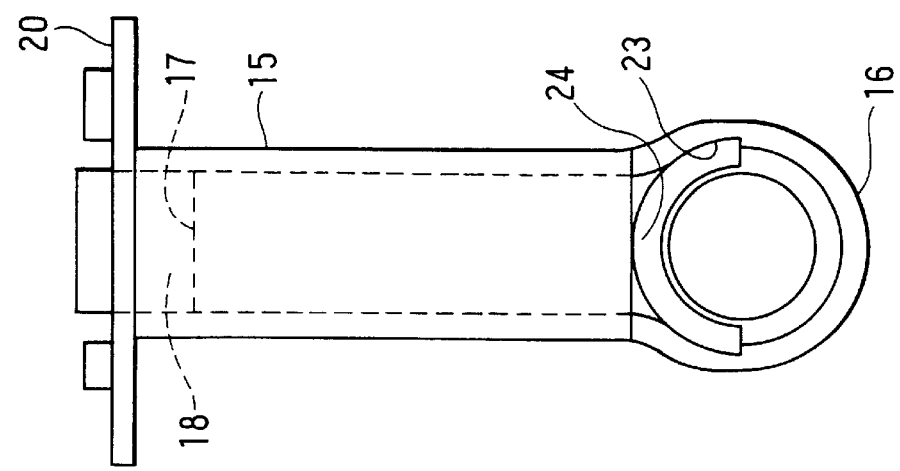
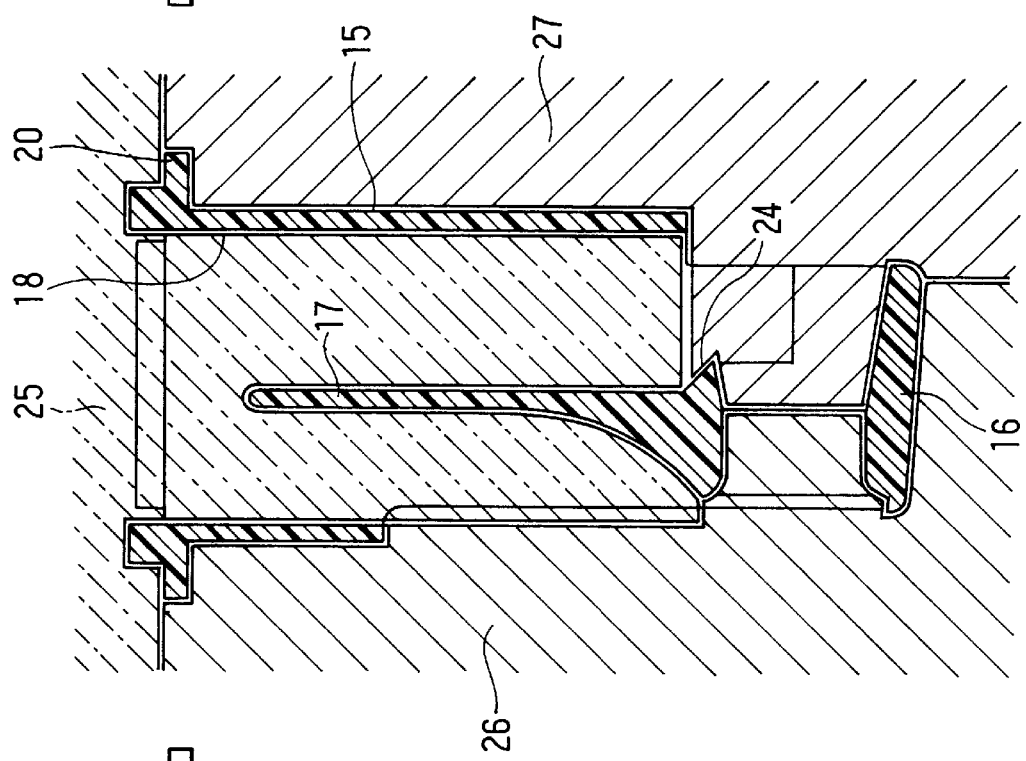
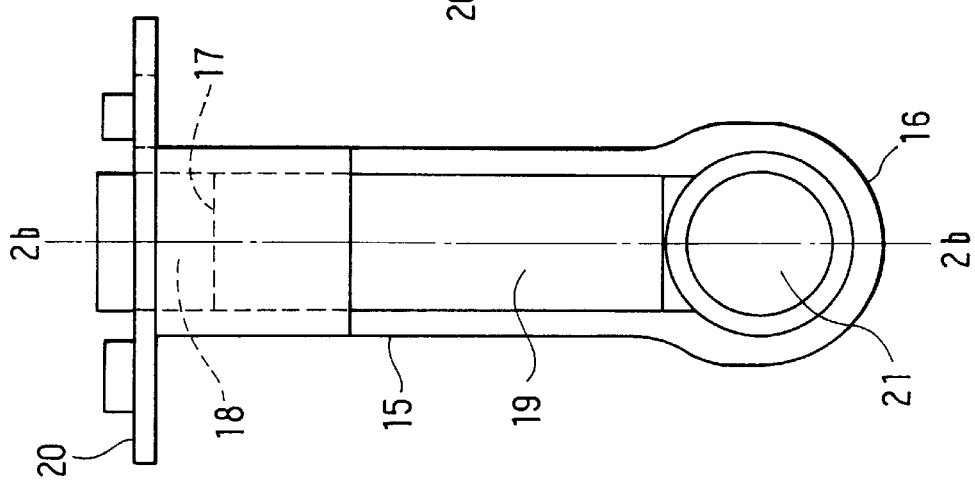
FIG. 2a
FIG. 2b
FIG. 2c $$\Delta P1 = \left(\frac{A20}{A10}\right)^2 \cdot \Delta P2$$

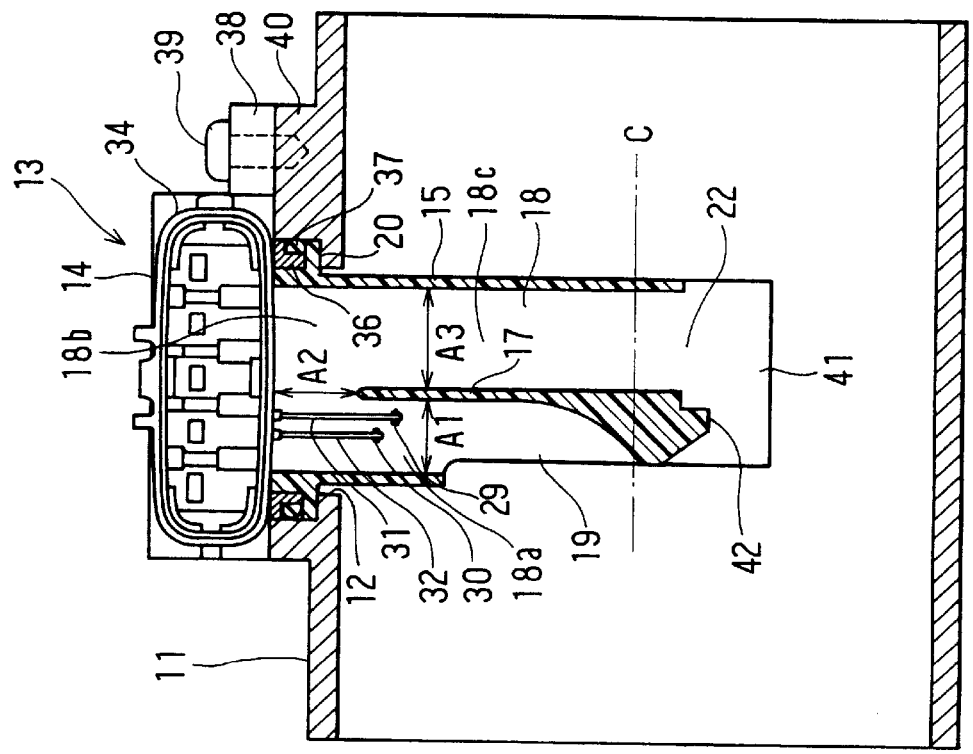
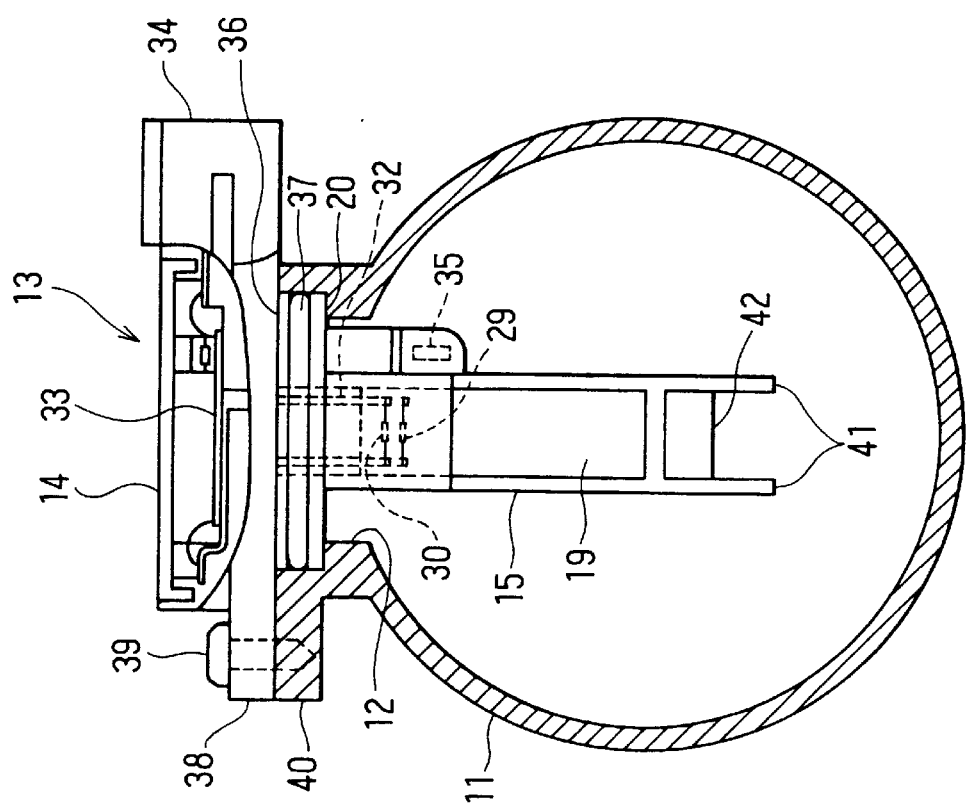

AIRFLOW METER HAVING AN INVERTED U-SHAPE BYPASS PASSAGE

CROSS REFERENCE TO RELATED APPLICATIONS

The present application is based on and claims priorities of Japanese Patent Applications No. 8-101776 filed on Apr. 24, 1996 and No. 8-103028 filed on Apr. 25, 1996, the contents of which are incorporated herein by reference.

BACKGROUND OF THE INVENTION

1. Field of the Invention

The present invention relates to an airflow meter for measuring airflow amount within an air duct by measuring an amount of air flowing through a bypass passage disposed within the air duct such as an engine intake air pipe.

2. Description of Related Art

Hitherto, an airflow meter of this type has been used to measure an intake airflow amount of an internal combustion engine. For example, as disclosed in Japanese Patent Laid-open No. Hei. 7-260535, an exothermic or heat generating element and a temperature sensing element are provided at a predetermined interval within a bypass passage disposed within an intake pipe of an internal combustion engine to measure an airflow amount in the bypass passage, and total intake airflow amount therefrom, based on electric power supplied to the exothermic element and a temperature detected by the temperature sensing element. Because its flow amount measuring accuracy drops when the flow of air within the bypass passage is unstable, an outflow port of the bypass passage is opened in the direction vertical or orthogonal to the direction of the main stream and walls which are almost parallel with the direction of the main stream are provided on the both sides of the outflow port of the bypass passage. Thereby, the influence of whirling flows produced within the main air duct (intake pipe of the internal combustion engine) on the outlet flow of the bypass passage is lessened to stabilize the flow at the outlet of the bypass passage.

It is preferable to increase the velocity of the bypass flow, in addition to stabilizing the flow of air within the bypass passage, to improve the flow amount measuring accuracy. Here, the velocity of the bypass flow may be increased by vacuuming the pressure at the outflow port of the bypass passage so as to suction the air within the bypass passage. From this aspect, a hood-like projection is provided at the upstream of the outflow port of the bypass passage to let the main stream run against the projection and break away to generate negative pressure at the downstream of the projection and to cause suction force to act on the outflow port of the bypass passage by negative pressure.

However, it is unable to cause the suction force (negative pressure) to act fully on the outflow port of the bypass passage and the effect of increasing the velocity of the bypass flow is small just by providing the hood-like projection at the upstream of the outflow port of the bypass passage.

According to Japanese Utility Model Laid-Open No. 61-199623, part of the main air duct is formed into a shape of venturi tube (hereinafter referred to as a "large venturi tube"), a small venturi tube is disposed concentrically within the large venturi tube, a bypass passage is provided around the outer periphery of the small venturi tube, and an outflow port of the bypass passage is opened within the small venturi tube. Thereby, the velocity of the airflow within the small venturi tube is increased by the two large and small venturi tubes to increase the suction force (negative pressure) which acts on the outflow port of the bypass passage.

However, because the part of the main air duct is formed into the large venturi tube and the relatively long small venturi tube is disposed concentrically within the large venturi tube in the structure described above, the whole apparatus becomes large. It is also cumbersome to assemble it with the intake air passage of the internal combustion engine because a double venturi tube unit in which the two large and small venturi tubes are assembled concentrically needs to be linked in the middle of the intake air passage. In short, the above-mentioned structure has a disadvantage that the airflow meter cannot be mounted by way of so-called plug-in method in a mounting hole which has been formed at an appropriate position of the intake passage. Still more, it has another disadvantage that because the inner venturi tube is large, air flow resistance of the intake air passage becomes large, thus lowering the intake efficiency.

In another type of airflow meter, as disclosed in Japanese Patent Laid-Open No. Hei. 2-41688, a flow amount measuring pipe which protrudes in the direction of center of an intake pipe of an internal combustion engine is assembled to the intake pipe and a space within the flow amount measuring pipe is parted into the upstream and down stream sides by a partition wall, except for the upper part, to provide a bypass passage of inverted U-shape within the flow amount measuring pipe. Thus, part of air flowing through the intake pipe is flown into the bypass passage from an inflow port at the side of the upstream side of the flow amount measuring pipe and is flown out from an outflow port provided at the downstream side of the flow amount measuring pipe. A flow amount measuring element (exothermic element) and a temperature sensing element are provided within the bypass passage to measure an airflow amount in the bypass airflow amount, and finally the total intake airflow amount, based on electric power supplied to the flow amount measuring element and temperature detected by the temperature sensing element. The bypass passage is formed into the inverted U-shape to prolong the whole length of the bypass passage to increase inertia of air within the bypass passage. Thereby, pulsation of the bypass flow caused by pulsation of flow of air within the intake pipe is reduced to prevent the flow amount measuring accuracy from dropping due to the pulsation.

Lately, it is required to improve the measuring accuracy in the low flow amount domain because of the enlarged measuring range of intake airflow amount due to the increase of output of the internal combustion engine and of the reinforcement of restriction on emission and in order to realize that, it is necessary to increase the velocity of bypass flow also in the low flow amount domain. However, if the bypass passage is formed into the inverted U-shape as described, the direction of the bypass flow is turned sharply by 180° by the turning section of the bypass passage, so that strong contraction flow is produced right after the turning section by inertia of the flow when the flow changes its direction, thus increasing the resistance of the flow and dropping the velocity of the bypass flow. Therefore, the velocity of the bypass flow cannot be fully maintained and the flow amount measuring accuracy drops at the low flow amount domain.

It is also disclosed that a surge tank chamber is provided right after the turning section of the bypass passage. In this case, although it can suppress the flow velocity from dropping due to the contraction flow right after the turning section because the passage sectional area right after the turning section of the bypass passage is enlarged substantially by the surge tank chamber, strong contraction flow occurs at the part from the surge tank chamber to the downstream of the bypass passage because the passage sectional area sharply decreases there, thus dropping the velocity of the bypass flow in the end.

In order to eliminate this disadvantage, in Japanese Patent Laid-Open No. Hei. 8-5427, a flow amount measuring member having a bullet shape is disposed at the center part of the intake pipe, a bypass passage is provided at the center part of this flow amount measuring member and an outflow port of the bypass passage is opened to an outer peripheral face of the flow amount measuring member. In this case, because a passage sectional area of the intake pipe is contracted by the flow amount measuring member, the velocity of air flowing along the outer peripheral face of the flow amount measuring member increases, suction force (negative pressure) acts on the outflow port of the bypass passage and thereby the velocity of the bypass flow increases.

However, because the outer diameter of the flow amount measuring member is increased to contract the passage sectional area of the intake pipe in order to increase the suction force (negative pressure) which acts on the outflow port of the bypass passage, air flow resistance of the intake pipe increases, thus dropping the intake efficiency.

SUMMARY OF THE INVENTION

The present invention therefore has a first object to provide an airflow meter which can reduce the size, which can be assembled by way of the plug-in method, which can increase the suction force (negative pressure) which acts on the outflow port of the bypass passage, which can enhance the flow amount measuring accuracy and which can reduce the air flow resistance.

The present invention has a second object to provide an airflow meter which can increase the velocity of the bypass flow and which can enhance the flow amount measuring accuracy without increasing the air flow resistance.

In order to achieve the first object, according to the first aspect of the present invention, a flow amount measuring body in which a venturi tube section is provided is mounted in an air duct by inserting thereto from a mounting hole provided on a peripheral wall of the air duct. A bypass passage for causing part of air flowing through the air duct to flow in from an inflow port provided on the side of the flow amount measuring body and to pass through the flow amount measuring body is provided within the flow amount measuring body and airflow amount is measured by a sensor section installed within the bypass passage. An outflow port of the bypass passage is provided near the part of peripheral wall of the venturi tube section where the velocity of air becomes fast to increase suction force (negative pressure) which acts on the outflow port of the bypass passage, to increase the velocity of airflow (bypass flow) within the bypass passage and to improve measuring accuracy of the flow amount. Further, the venturi tube section is provided such that its length is almost equal to or smaller than a width of the flow amount measuring body in the direction of airflow within the air duct to miniaturize the whole apparatus to allow to assembly by way of plug-in method and to reduce air flow resistance.

It is preferable to provide the bypass passage into an invades U-shape within the flow amount measuring body. Thereby, the whole length of the bypass passage is prolonged and an inertia of air within the bypass passage is increased. It allows pulsation of the bypass flow caused by pulsation of airflow within the air duct (main stream) to be reduced and to prevent the measuring accuracy of the flow amount, from dropping due to the pulsation.

It is preferable to provide a passage enlarging section for enlarging a sectional area of the passage of the venturi tube section at part of the peripheral wall at the downstream of the venturi tube section where the bypass flow from the bypass passage joins. That is, because the flow amount of air flowing through the venturi tube section increases when the bypass flow from the bypass passage joins at the downstream of the venturi tube section, the flow after the confluence is smoothed and the suction force (negative pressure) which acts on the outflow port of the bypass passage is increased effectively by enlarging the sectional area of the passage at the confluent section by the passage enlarging section.

It is preferable to extend the passage enlarging section which is to be provided at the confluent section of the bypass flow along the circumferential direction of the venturi tube section. Thereby, an area in which the suction force (negative pressure) acts on the outlet flow of the bypass passage is increased and the suction force is increased further.

Further, preferably, a guide section is provided at the outflow port of the bypass passage to guide the bypass flow toward the downstream of the venturi tube section. It allows the bypass flow to join smoothly with the flow within the venturi tube section and to prevent the velocity of bypass flow from dropping due to the collision of the flows at the time of confluence.

Preferably, a flange which is to be anchored to a peripheral edge of the mounting hole at the peripheral wall of the air duct is formed at the end of the flow amount measuring body at the mounting side. The flange prevents the flow amount measuring body from falling and being sucked into the air duct even if the means for fixing the flow amount measuring body breaks by rare accident.

Preferably, the flow amount measuring body and the venturi tube section are molded in a body by resin by three parts of molding dies and an opening for pulling out the die provided at the end of the flow amount measuring body at the mounting side is closed by a circuit module to which the sensor section is assembled. By constructing in this way, the flow amount measuring body and the venturi tube section may be formed as one molded parts, a number of parts of the airflow meter may be reduced and the assembling efficiency may be improved.

In order to achieve the first object, according to another aspect of the present invention, a bypass passage and a venturi tube section are provided within an air duct, an outflow port of the bypass passage is provided at the part of a peripheral wall of the venturi tube section where the velocity of airflow becomes fast and a passage enlarging section for enlarging a sectional area of the passage of the venturi tube section is provided at the part of the peripheral wall at the downstream of the venturi tube section where the bypass flow from the bypass passage joins. It allows both the miniaturization of the airflow meter and the improvement of the flow amount measuring accuracy to be realized.

It is preferable to provide the venturi tube section such that the further on the downstream side, the larger the outer diameter thereof becomes. By constructing in this way, the further on the downstream side of the venturi tube section, the narrower the air passage between the outer peripheral face of the venturi tube section and the inner peripheral face of the air duct becomes, so that the further on the downstream side of the venturi tube section, the faster the air flow (main stream) of the air passage becomes. The suction force (negative pressure) which acts on the outflow port of the venturi tube section is increased by the main stream. Thereby, the velocity of the airflow within the venturi tube section increases more and more and the suction force (negative pressure) which acts on the outflow port of the bypass passage increases more and more.

It is preferable to provide the inflow port of the venturi tube section in close vicinity with the inflow port of the bypass passage while interposing a central axis of the air duct therebetween. Thereby, air flowing through the air duct flows into both the inflow port of the venturi tube section and the inflow port of the bypass passage in good balance and the bypass flow is assured stably. Further, although the distribution of velocity of the main stream within the air duct changes due to a curve of the air duct, an average bypass flow may be assured, allowing the flow amount to be measured stably even if the distribution of velocity of the main stream changes due to the curve of the air duct at the upstream side of the venturi tube section provided that the inflow port of the venturi tube section is put in close vicinity of the inflow port of the bypass passage while interposing the central axis of the air duct therebetween.

In order to achieve the second object, according to the second aspect of the present invention, a bypass passage which is provided within an air duct is formed as an inverted U-shape passage in which two adjoining parallel passages are linked by a turning section to prolong the whole length of the bypass passage and to reduce pulsation of the bypass flow caused by pulsation of airflow within the air duct. Further, the turning section and the downstream side passage are formed into shapes which suppress contraction flow generated at the downstream of the turning section to prevent the flow velocity from dropping due to the contraction flow, to maintain the velocity of the bypass flow even in a low flow amount domain and to improve the flow amount measuring accuracy. Further, because no flow amount measuring member having a large diameter as in the past needs to be provided within the air duct, the air flow resistance is small.

Preferably, a passage sectional area around the boundary of the turning section and the downstream side passage may be set larger than a passage sectional area of the upstream side passage and may be changed moderately. Thereby, the contraction flow generated at the downstream of the turning section is effectively suppressed.

Preferably, the passage sectional area of the whole downstream side passage may be set larger than the passage sectional area of the upstream side passage. That is, because the contraction flow is generated at the downstream side passage, the effect of suppressing the contraction flow may be obtained even if the passage sectional area of the whole downstream side passage is increased.

Preferably, the passage sectional area of the turning section may be set larger than the passage sectional area of the upstream side passage. When the passage sectional area of the turning section is thus increased, the change of direction of the flow at the turning section becomes moderate and the contraction flow generated by the inertia of the flow right after the turning section is reduced.

It is preferable to provide the flow amount measuring element at a spot where the passage sectional area of the bypass passage is small. That is, the velocity of the bypass flow is fast at the spot where the passage sectional area of the bypass passage is small, thus allowing to measure the flow amount stably.

Preferably, the flow amount measuring element may be provided at the upstream side passage as described in Claim 6. Because the velocity of the bypass flow is fast and is stable at the upstream side passage as compared to other parts, the flow amount may be measured stably by providing the flow amount measuring element at the upstream side passage.

BRIEF DESCRIPTION OF THE DRAWINGS

Other objects, features and advantages of the present invention will become more apparent from the following detailed description when read with reference to the accompanying drawings, in which:

FIG. 2a is a left side view of a part of the flow amount measuring body and a venturi tube part molded in a body, FIG. 2b is a sectional view taken along the line 2b—2b and showing a state when it is molded by three parts of molding dies, and FIG. 2c is a right side view of the integrally molded part;

FIG. 11a is a longitudinal sectional left side view showing an assembly state of an airflow meter according to the third embodiment of the present invention, and FIG. 11b is a longitudinal sectional front view thereof;

DETAILED DESCRIPTION OF PRESENTLY PREFERRED EMBODIMENTS

Figure 1A:
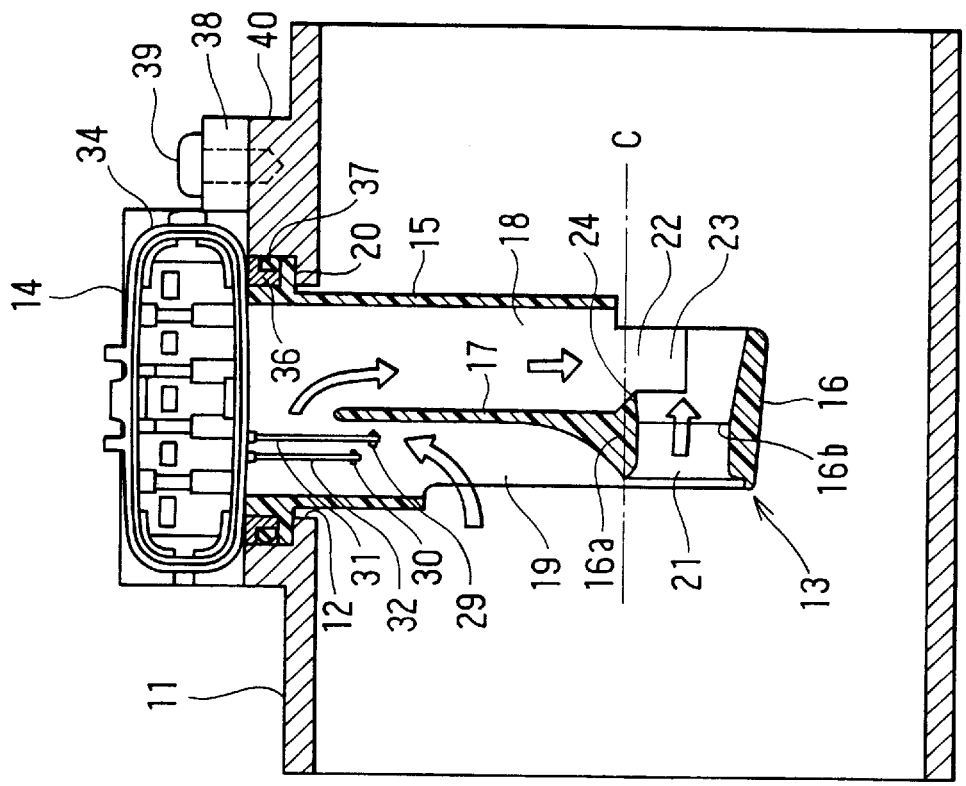
FIG. 1a is a longitudinal section view showing an assembly state of an airflow meter according to the first embodiment of the present invention.

An airflow meter according to the present invention will be described with reference to various embodiments in which the airflow meter is applied to measure amount of air flowing onto an internal combustion engine and in which the same or similar parts are designated by the same reference numerals to omit repeated description.

First Embodiment

Figure 1B:
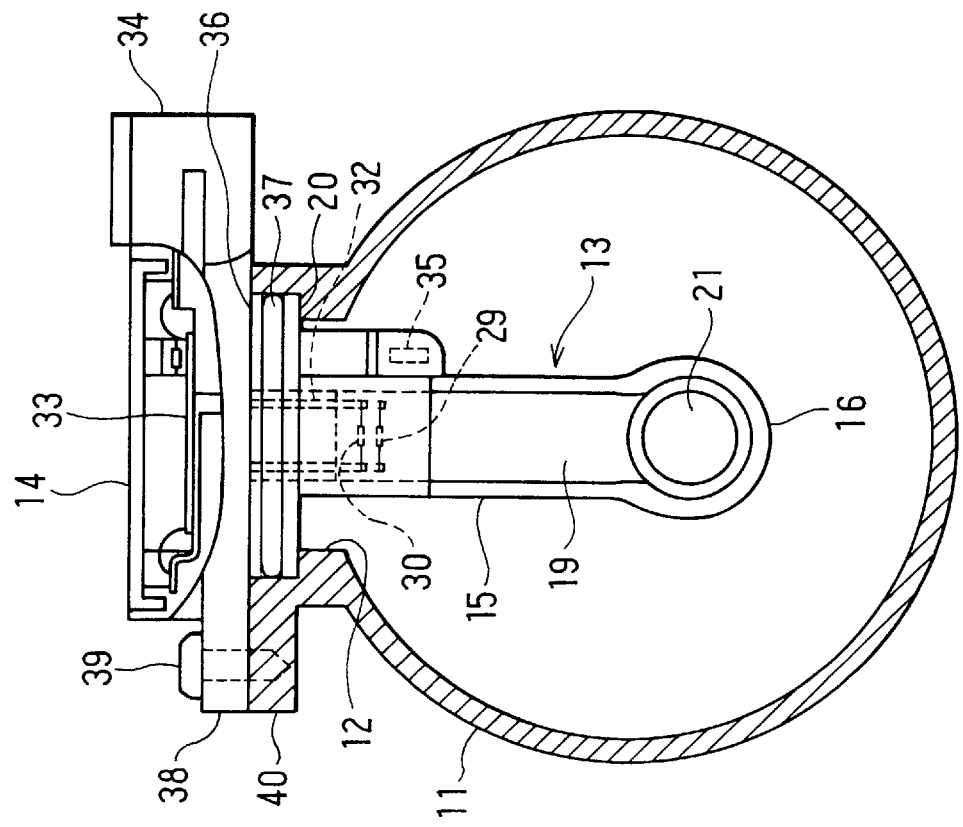
FIG. 1b is a longitudinal sectional front view thereof.

An airflow meter 13 is assembled, as shown in FIGS. 1a and 1b, in a mounting hole 12 which is provided at a predetermined position of an intake pipe 11 (air duct) of the internal combustion engine by way of the plug-in method. The airflow meter 13 comprises a circuit module 14 and a flow amount measuring body 15. The flow amount measuring body 15 is formed into a shape of bar extending from the mounting hole 12 to around the central axis C of the intake air pipe 11 and having a longitudinal rectangular section. The flow amount measuring body 15 is formed such that two pipes which extend along the radial direction of the intake air pipe 11 are put side by side and are joined by a junction wall 17 along the direction of airflow in the intake air pipe 11. They communicate at the upper part of the junction wall 17 on the side of the circuit module 14 to form an inverted U-shaped bypass passage 18 having a turn-around section on the side of the circuit module 14. Formed on the side of the flow amount measuring body 15 at the upstream side so as to adjoin to the central axis C of the intake air pipe 11 is an inflow port 19 for taking a part of air (main stream) flowing through the intake air pipe 11 into the bypass passage 18. A flange 20 is also formed at the outer periphery of the upper end of the flow amount measuring body 15 such that the flange 20 is anchored (to stop to be pulled out) to the upper face of the peripheral portion of the mounting hole 12.

A venturi tube 16 is formed at the lower end of the flow amount measuring body 15 in parallel with the direction of the main stream and an inflow port 21 of the venturi tube section 16 is put in close vicinity with the inflow port 19 of the bypass passage 18 interposing the uppermost wall 16a of the venturi tube section 16 (the central axis C of the intake air pipe 11) therebetween. An outflow port 22 of the bypass passage 18 is provided at the peripheral wall at the downstream of a throat portion (throttle portion) 16b of the venturi tube section 16 where the velocity of air flow becomes the fastest so that the flow (bypass flow) in the bypass passage 18 joins with the flow (venturi flow) within the venturi tube section 16 at the downstream, i.e., near the throat portion 16b, of the venturi tube section 16.

Figure 3:
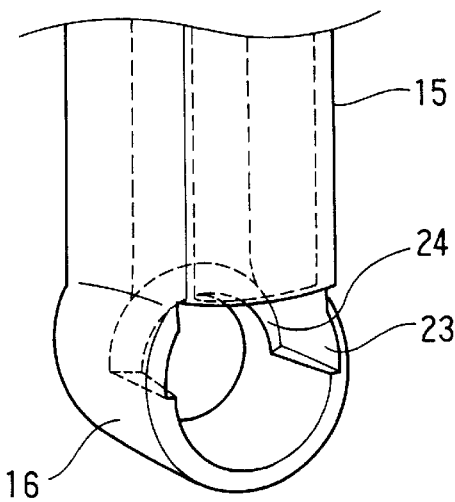
FIG. 3 is a perspective view showing the lower part of the venturi tube part and the flow amount measuring body.

Further, a passage enlarging section 23 (FIGS. 2c and 3) for enlarging a sectional area of the passage of the venturi tube section 16 is formed at the part of the peripheral wall at the downstream of the venturi tube section 16 where the bypass flow from the bypass passage 18 joins. According to the present embodiment, the passage enlarging section 23 is formed so as to extend within a range of approximately 180° along the circumferential direction of the venturi tube section 16. It is noted that although the range of the extension of the passage enlarging section 23 is not limited only to approximately 180° but it may be wider or narrower than that, the extension range of the passage enlarging section 23 is preferable to be wider to smooth the flow after the confluence.

According to the present embodiment, a guide section 24 (FIG. 1b) for guiding the bypass flow toward the downstream side of the venturi tube section 16 is also formed at the outflow port 22 of the bypass passage 18 by forming the end face of the passage enlarging section 23 at the upstream aslant by a conical face whose diameter decreases from the upstream to the downstream. The venturi tube section 16 is formed so that the further on the downstream side, the larger the outer diameter thereof becomes. The further on the downstream side of the venturi tube section 16, the narrower an air passage between the outer peripheral face of the venturi tube section 16 and the inner peripheral face of the intake air pipe 11 becomes.

Further, the venturi tube section 16 is formed such that its length is shorter, more or less, than the width of the flow amount measuring body 15 in the main stream direction. It is because part of the venturi tube section 16 at the downstream side is cut so that it can be inserted through the mounting hole 12 because the further on the downstream side, the larger the outer diameter of the venturi tube section 16 becomes. Accordingly, the venturi tube section 16 may be formed such that its length is almost equal to the width of the flow amount measuring body 15 in the main stream direction as long as the mounting hole 12 is formed to be larger than the measuring body 15.

As shown in FIG. 2b, the flow amount measuring body 15 having the venturi tube section 16 and the flange 20 is molded in a single body by resin by three parts of molding dies 25, 26 and 27. That is, the first molding die 25 which slides in the vertical direction forms the internal part of the flow amount measuring body 15, the second molding die 26 which slides in the horizontal direction forms the outer peripheral face and inner peripheral face at the upstream side of the venturi tube section 16 and the third molding die 27 which slides also in the horizontal direction forms the inner peripheral face at the downstream side of the venturi tube section 16. The outer peripheral face of the flow amount measuring body 15 is formed by the second and third molding dies 26 and 27.

An opening for pulling out the mold formed at the upper end of the flow amount measuring body 15 is closed by the circuit module 14 as shown in FIG. 1b. An exothermic or heat generating element 29 and a temperature sensing element 30 which compose a sensor section are assembled at a predetermined interval by supporting members 31 and 32, respectively, at the lower face of the circuit module 14. The exothermic element 29 and the temperature sensing element 30 are installed at the position closer to the upstream side from the turn-around section of the bypass passage 18. A circuit board 33 for controlling electric power fed to the exothermic element 29 and the temperature sensing element 30 is provided within the circuit module 14. A connector 34 for connecting a wire harness (not shown) is insert-molded on the side of the circuit module 14. Further, an intake air temperature sensor 35 (FIG. 1a) is insert-molded so as to protrude downward at the lower face side of the circuit module 14. The intake air temperature sensor 35 is positioned on the side of the flow amount measuring body 15 so as to detect a temperature of air (intake air temperature) flowing through the intake air pipe 11.

It is noted that the flange 20 at the upper end of the flow amount measuring body 15 is joined by means of fusion or adhesion with an engaging convex portion 36 at the lower face of the circuit module 14 and the inner peripheral portion of the mounting hole 12 is sealed by an O-ring 37 attached around the circumference of the engaging convex portion 36. Then, the airflow meter 13 is assembled in the mounting hole 12 of the intake air pipe 11 by way of the plug-in method by inserting a screw 39 through a screw through hole of a fixing piece 38 provided at the side of the circuit module 14 and by screwing it into a screw hole of a mounting flange 40 provided on the intake air pipe 11.

In the airflow meter 13 constructed as described above, part of air flowing through the intake air pipe 11 is divided by and flown into the bypass passage 18 and the venturi tube section 16. The air flown into the bypass passage 18 (bypass flow) joins with the flow of air within the venturi tube section 16 (venturi flow) at the downstream of the venturi tube section 16 where the velocity of airflow increases. At the confluence section, suction force (negative pressure) acts on the outflow port 22 of the bypass passage 18 due to the venturi flow, thus increasing the velocity of the bypass flow. A bypass flow amount of intake air is measured based on electric power supplied to the exothermic element 29 and temperature detected by the temperature sensing element 30 which are exposed to the bypass flow, so that the total airflow amount through the intake pipe 11 is calculated from the measured bypass airflow amount. That is, the current (exothermic temperature) of the exothermic element 29 and the detected temperature (intake air temperature) of the temperature sensing element 30 are controlled so that their temperature difference becomes constant to measure the intake airflow amount by the value of current of the exothermic element 29 at that time.

Figure 4A:
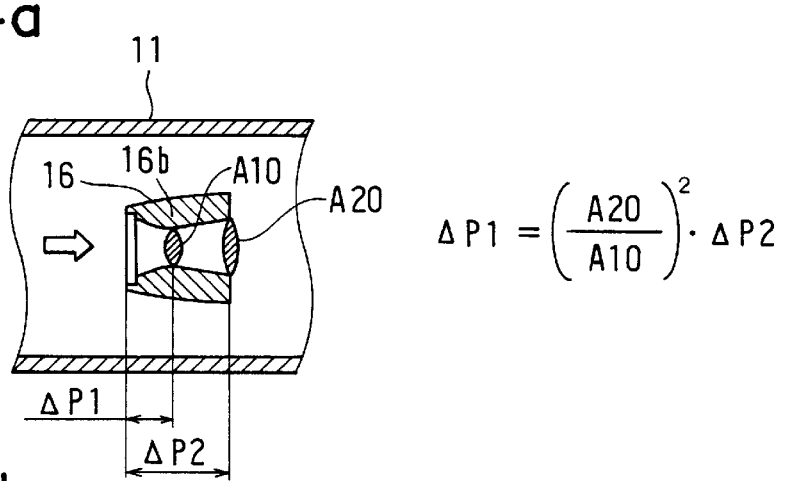
FIG. 4a is a schematic view of an airflow meter in a simplified form.

Here, the flow of air within the venturi tube section 16 will be studied. When a sectional area of the passage at the throat portion (throttle portion) 16b of the venturi tube section 16 is denoted by A, a sectional area of the passage at the outflow port by A20, a difference of pressures at the inflow port and the throat portion by $\Delta P1$, and a difference of pressures at the inflow port and the outflow port by $\Delta P2$ as shown in FIG. 4a, there is a relationship as expressed by the following expression:

$$\Delta P1 = (A20/A10)^2 \cdot \Delta P2$$

Figure 4B:
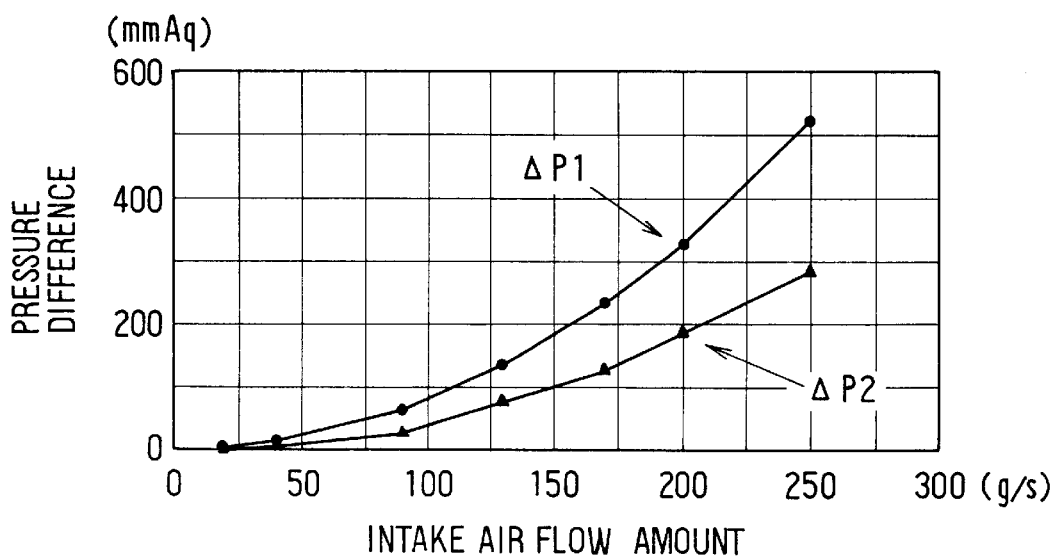
FIG. 4b is a graph showing a relationship between differences of pressures from an inflow port of the venturi tube section and a flow amount of an intake pipe.

When the difference of pressures $\Delta P1$ and $\Delta P2$ were actually measured, the measurement result was obtained as shown in FIG. 4b. The difference of pressures from the inflow port of the venturi tube section 16 reaches the maximum and the velocity of the venturi flow reaches the maximum at the throat portion 16b. Because the faster the velocity of the venturi flow, the greater the suction force (negative pressure) which acts on the outflow port 22 of the bypass passage 18 becomes, it is preferable to form the outflow port 22 of the bypass passage 18 around the throat portion where the velocity of the venturi flow reaches the maximum.

Figure 5A:
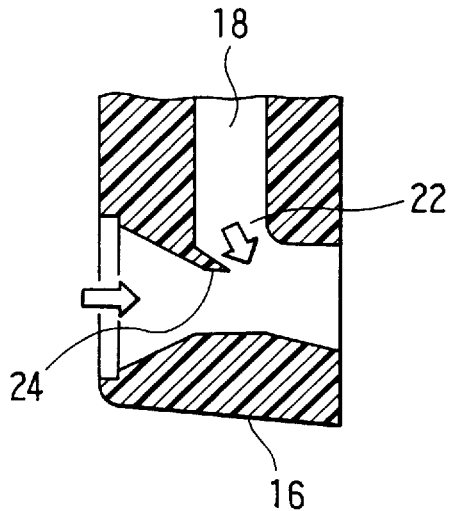
FIGS. 5a and 5b are schematic views explaining an operation of a guide section provided at an outflow port of a bypass passage.
Figure 5B:
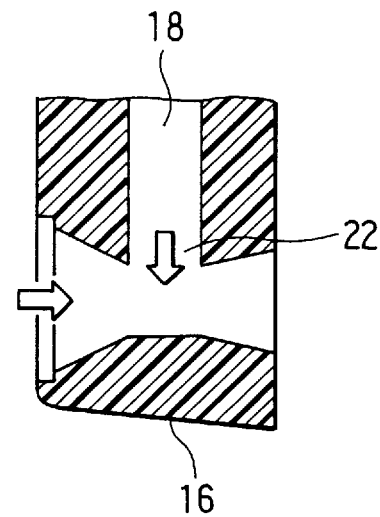

However, if the outflow port 22 of the bypass passage 18 is provided perpendicularly to the venturi flow as shown in FIG. 5b, the bypass flow runs against the venturi flow at right angles at the outflow port 22 of the bypass passage 18, so that the strength of the bypass flow is cut down and the velocity of the bypass flow drops.

Figure 5C:
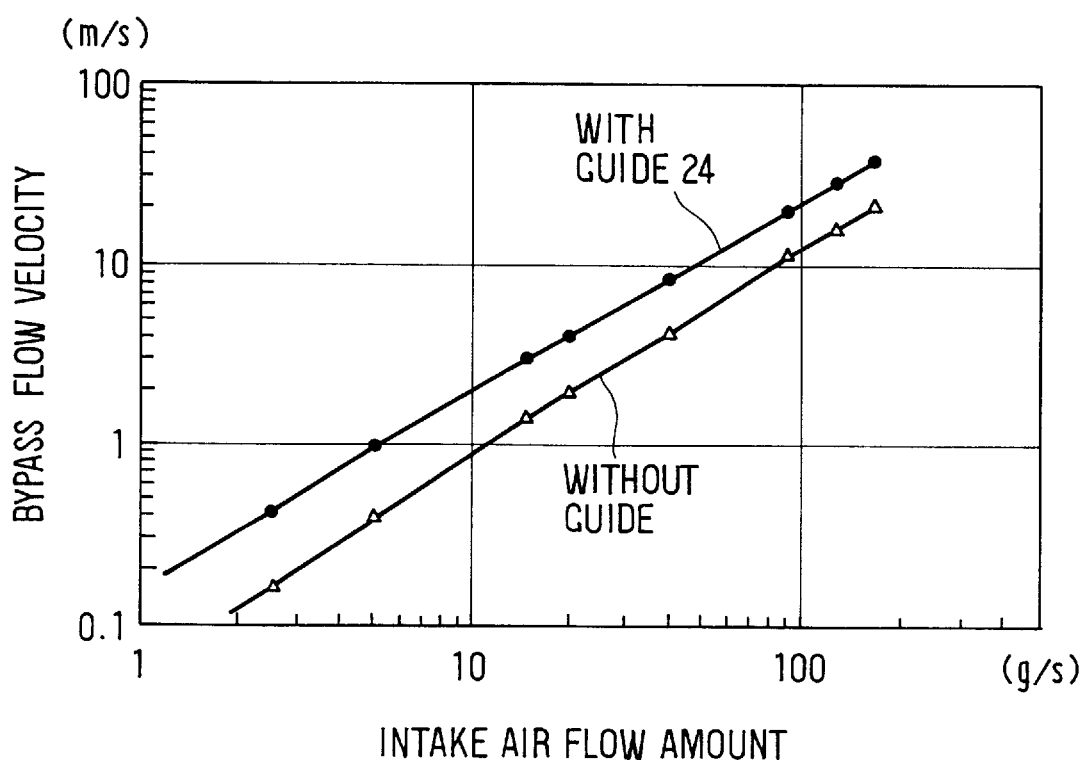
FIG. 5c is a graph showing a relation between the bypass flow velocity and the intake air amount.

Then, when the guide section 24 which guides the bypass flow toward the downstream of the venturi tube section 16 is provided at the outflow port 22 of the bypass passage 18 as shown in FIG. 5a, an angle of confluence of the bypass flow approaches to the flow direction of the venturi flow, so that it becomes possible to let the bypass flow to join with the venturi flow smoothly and to prevent the velocity of the bypass flow from dropping due to the collision of the flows at the time of confluence. It thus allows the velocity of the bypass flow to be increased by effectively utilizing the suction force (negative pressure) which acts on the outflow port of the bypass passage 18 and the velocity of the bypass flow to be increased as shown in the measurement result in FIG. 5c.

According to the airflow meter 13 of the present embodiment described above, the venturi tube section 16 is been provided such that its length is approximately equal to or shorter than the width of the flow amount measuring body 15 in the main stream direction, so that the whole airflow meter 13 may be miniaturized and may be assembled by way of the plug-in method. Accordingly, the airflow meter 13 may be assembled very easily by providing a mounting hole 12 of predetermined dimension not only on the intake air pipe 11 but also on another member which composes part of the intake pipe such as an air cleaner or throttle body. Therefore, the airflow meter 13 may be made in common and the cost thereof may be lowered. Still more, because the venturi tube section 16 is small, the air flow resistance of the intake air pipe 11 may be reduced, allowing to improve the air intake efficiency.

Further, because the passage enlarging section 23 is provided at the part of the peripheral walls at the downstream of the venturi tube section 16 where the bypass flow joins in view of the fact that the amount of air which flows through the venturi tube section 16 increases when the bypass flow joins at the downstream of the venturi tube section 16, the passage sectional area which corresponds to the increase of the flow amount after the confluence may be assured, the flow after the confluence may be flown smoothly and the suction force (negative pressure) which acts on the outflow port 22 of the bypass passage 18 may be increased effectively.

Further, because the venturi tube section 16 is provided such that the outer diameter thereof is larger at the downstream side, the further on the downstream side of the venturi tube section 16, the narrower the air passage between the outer peripheral face of the venturi tube section 16 and the inner peripheral face of the intake air pipe 11 becomes. Therefore, the further on the downstream side of the venturi tube section 16, the faster the air flow (main stream) within the intake air pipe 11 becomes. Then, the main stream allows the suction force (negative pressure) which acts on the outflow port of the venturi tube section 16 to be increased, the velocity of the airflow within the venturi tube section 16 to be increased and the suction force (negative pressure) which acts on the outflow port of the bypass passage 18 to be increased.

Still more, because the flange 20 which is formed in a body at the upper end of the flow amount measuring body 15 is anchored to the peripheral edge of the mounting hole 12 of the intake air pipe 11, the flange 20 reliably prevents the flow amount measuring body 15 or the O-ring 37 from falling and from being sucked to the internal combustion engine even if the junction between the flow amount measuring body 15 and the circuit module 14 breaks away accidentally, thus preventing a break-down from occurring.

Further, because the inflow port 21 of the venturi tube section 16 is put in close vicinity with the inflow port 19 of the bypass passage 18 while interposing the wall 16a on the central axis C of the intake air pipe 11 in view of the fact that the distribution of velocity of the main stream within the intake air pipe 11 changes due to a curve of the intake air pipe 11, an average bypass flow may be assured even if the distribution of velocity of the main stream changes, thus allowing to measure the flow amount stably.

Second Embodiment

Figure 6:
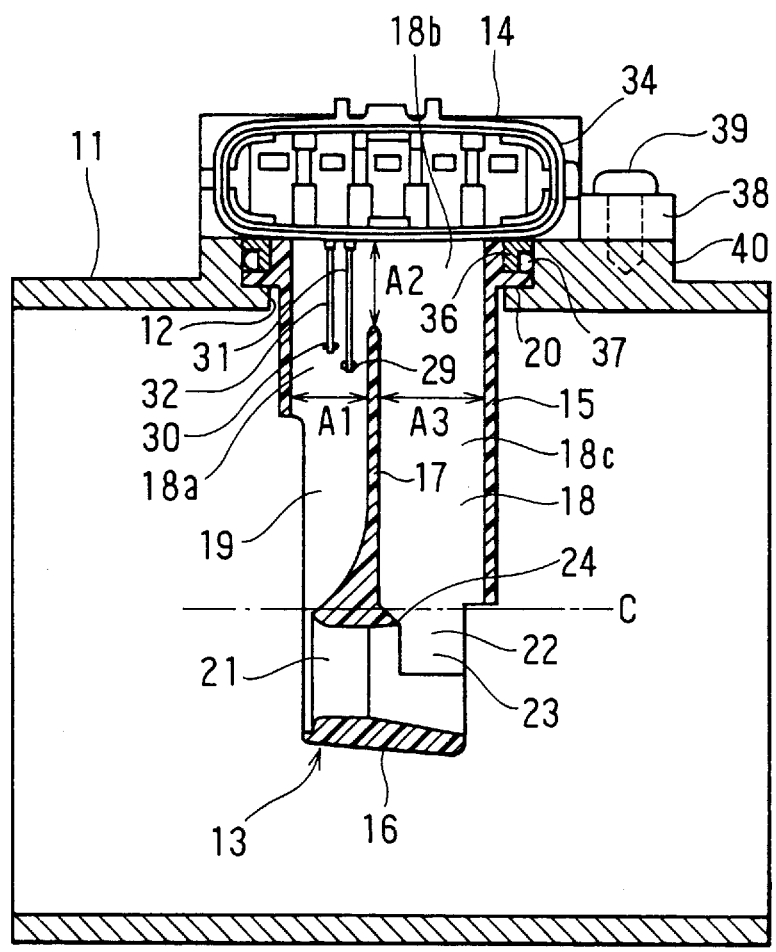
FIG. 6 is a longitudinal sectional front view of an airflow meter according to the second embodiment of the present invention.

In the second embodiment shown in FIG. 6, the airflow meter 13 is constructed generally similarly. However the airflow amount measuring body 15 is formed into a shape of square cylinder extending from the mounting hole 12 to around the central axis C of the intake pipe 11. The flow amount measuring body 15 is formed such that two pipes which extend along the radial direction of the intake pipe 11 are put side by side and are junctioned by a junction wall 17 along the direction of air flow of the intake pipe 11 to provide an inverted U-shaped bypass passage 18 in which two passages 18a and 18c which adjoin each other in parallel are linked by a turning section 18b. A relationship of sizes of a passage sectional area A1 of the upstream side passage 18a of the bypass passage 18, a passage sectional area A2 of the turning section 18b and a passage sectional area A3 of the downstream side passage 18c is set as A1<A2 and A1<A3, more preferably $A2/A1 \geq 1.14$ and $A3/A1 \geq 1.20$, to suppress contraction flow which is likely to occur at the downstream of the turning section 18b.

Further, the passage enlarging section 23 for enlarging a sectional area of the passage of the venturi tube section 16 is formed at the part of the peripheral wall at the downstream of the venturi tube section 16 where the bypass flow from the bypass passage 18 joins so as to extend in the circumferential direction. The guide section 24 for guiding the bypass flow toward the downstream side of the venturi tube section 16 is also formed at the outflow port 22 of the bypass passage 18 by forming the end face of the passage enlarging section 23 at the upstream aslant.

The venturi tube section 16 is formed so that the further on the downstream side, the larger the outer diameter thereof becomes and the further on the downstream side of the venturi tube section 16, the narrower an air passage between the outer peripheral face of the venturi tube section 16 and the inner peripheral face of the intake pipe 11 becomes. Thereby, the further on the downstream side of the venturi tube section 16, the faster the airflow (main stream) within the intake pipe 11 becomes. Thus, the suction force (negative pressure) which acts on the outflow port of the venturi tube section 16 increases by the main stream and the velocity of the airflow within the venturi tube section 16 increases.

The exothermic element 29 and the temperature sensing element 30 are installed at the upstream side passage 18a within the bypass passage 18, because the passage sectional area A1 of the upstream side passage 18a is the smallest among the sectional areas A1 through A3 and the velocity of the bypass flow becomes the fastest there within the bypass passage 18 and because the faster the velocity of the bypass flow, the better the flow amount measuring accuracy is. Further, it is preferable to install the temperature sensing element 30 near the flow amount measuring element 29 in the range not affected by the radiated heat of the flow amount measuring element 29 to measure temperature of air which contacts with the flow amount measuring element 29.

In the airflow meter 13 constructed as described above, part of air flowing through the intake pipe 11 is divided by and flown into the bypass passage 18 and the venturi tube section 16. The air flown into the bypass passage 18 (bypass flow) joins with the flow of air within the venturi tube section 16 (venturi flow) at the downstream of the venturi tube section 16 where the velocity of airflow increases. At the confluence section, suction force (negative pressure) acts on the outflow port 22 of the bypass passage 18 due to the venturi flow, thus increasing the velocity of the bypass flow. The bypass flow amount and intake air is measured based on electric power supplied to the exothermic element 29 and temperature detected by the temperature sensing element 30 which are exposed to the bypass flow. That is, the current (exothermic temperature) of the exothermic element 29 and the detected temperature (intake air temperature) of the temperature sensing element 30 are controlled so that their temperature difference becomes constant to measure the intake airflow amount by the value of current of the exothermic element 29 at that time.

The velocity of the bypass flow which contacts with the flow amount measuring element 29 needs to be increased in order to improve the flow amount measuring accuracy. While it is unavoidable that contraction flow occurs right after the turning section 18b by inertia of the bypass flow when its direction is changed at the turning section 18b because the bypass passage 18 is formed in the inverted U-shape, resistance of the flow increases and the velocity of the bypass flow drops if the contraction flow becomes strong.

Therefore, according to the present embodiment, the relationship of the sizes of the passage sectional area A1 of the upstream side passage 18a of the bypass passage 18, the passage sectional area A2 of the turning section 18b and the passage sectional area A3 of the downstream side passage 18c is set as A1<A2 and A1<A3, more preferably $A2/A1 \geq 1.14$ and $A3/A1 \geq 1.20$, to suppress the contraction flow which is likely to occur at the downstream of the turning section 18b . That is, if the passage sectional areas A2 and A3 of the turning section 18b and the downstream side passage 18c are increased as compared to the passage sectional area A1 of the upstream side passage 18a, the change of direction of the flow at the upstream side passage 18a→turning section 18b downstream side passage 18c becomes moderate. Thus, the contraction flow which is likely to occur by the inertia of the flow right after the turning section 18b is reduced, a loss of pressure due to the friction between the inner wall faces of the turning section 18b and 18c and air is reduced due to the increase of the passage sectional area, the flow at the turning section 18b→downstream side passage 18c→outflow port 22 becomes smooth and the velocity of the bypass flow which contacts with the flow amount measuring element 29 increases more. Further, the whole length of the bypass passage 18 is prolonged and pulsation of the bypass flow caused by pulsation of airflow within the intake pipe 11 may be reduced by forming the bypass passage 18 into the inverted U-shape. Thereby, together with the increase of the velocity of the bypass flow, the flow amount measuring accuracy may be enhanced.

Figure 7:
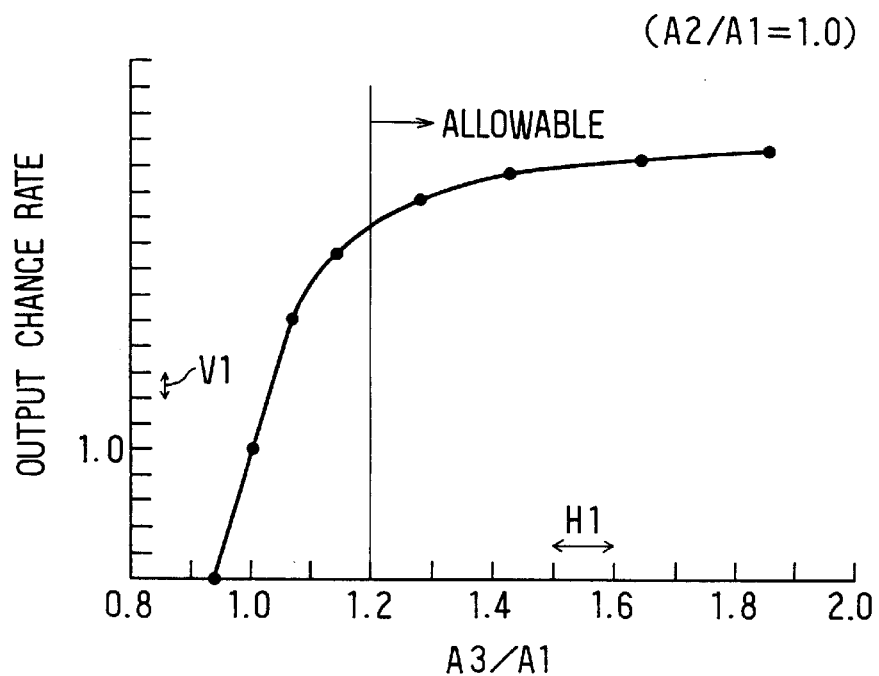
FIG. 7 is a graph of the change of actually measured output characteristic of a flow amount measuring element when a ratio of a passage sectional area of a downstream side passage to a passage sectional area of an upstream side passage of a bypass passage is changed.

Next, the passage sectional areas A1, A2 and A3 of each part of the bypass passage 18 and changes in the output characteristic of the flow amount measuring element 29 will be considered. FIG. 7 is a graph of a amount of change of the output characteristic of the flow amount measuring element 29 actually measured when the passage sectional area A1 of the upstream side passage 18a and the passage sectional area A2 of the turning section 18b are set equal (A2/A1=1) and the ratio of the passage sectional area A3 of the downstream side passage 18c to the passage sectional area A1 of the upstream side passage 18a (A3/A1) is changed. Here, if production variation of A3/A1 is assumed to be about one division H1 of the horizontal axis of the graph in FIG. 7 and an allowable range of variation of the amount of change of the output characteristic is assumed to be about one division V1 of the vertical axis, A3/A1 must be 1.20 or more in order to keep the amount of change of the output characteristics within the allowable range of variation.

Figure 8:
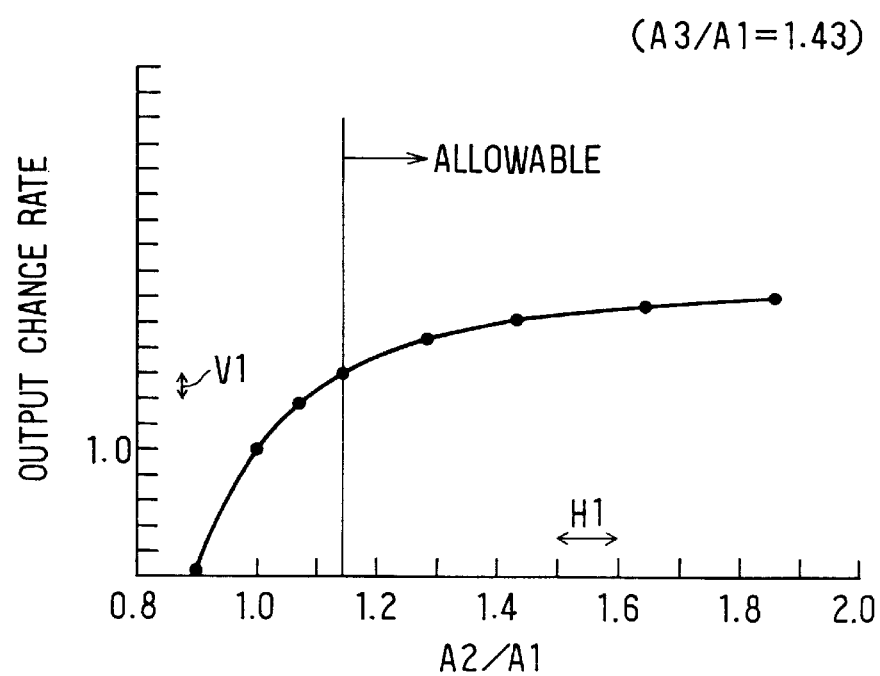
FIG. 8 is a graph of the change of actually measured output characteristic of the flow amount measuring element when a ratio of a passage sectional area of a turning section to the passage sectional area of the upstream side passage of the bypass passage is changed.

FIG. 8 is a graph of the amount of change of the output characteristic of the flow amount measuring element 29 actually measured when the ratio of the passage sectional area A3 of the downstream side passage 18c to the passage sectional area A1 of the upstream side passage 18a (A3/A1)

is set at 1.43 and the ratio of the passage sectional area A2 of the turning section 18b to the passage sectional area A1 of the upstream side passage 18a (A2/A1) is changed. If the production variation of A2/A1 is assumed to be about one division H1 of the horizontal axis and an allowable range of variation of the amount of change of the output characteristic is assumed to be about one division V1 of the vertical axis also in this case, A1/A1 must be 1.14 or more in order to keep the amount of change of the output characteristics within the allowable range of variation.

Figure 9:
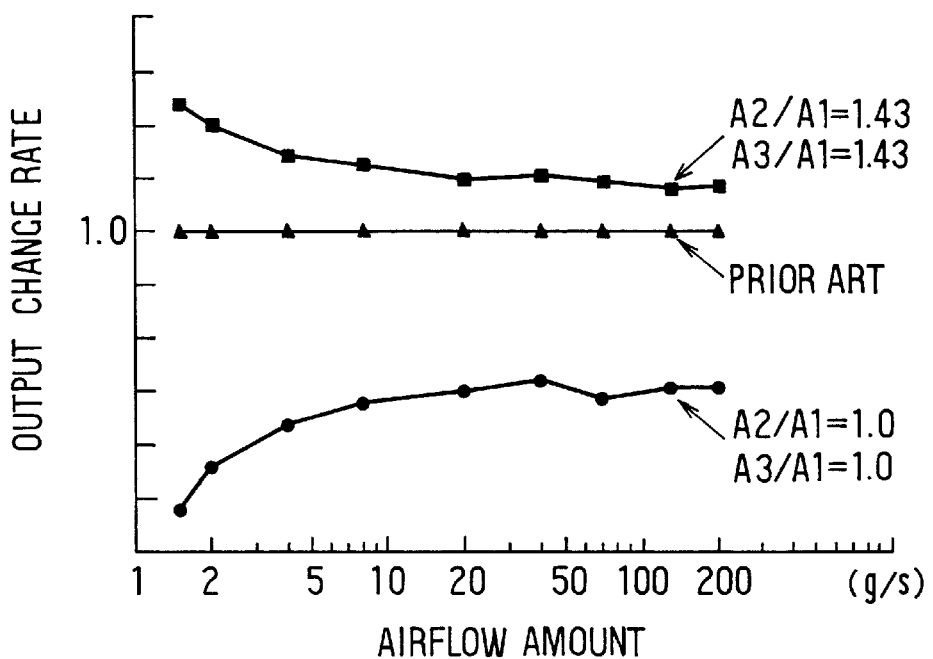
FIG. 9 is a graph of the change of actually measured output characteristic of the flow amount measuring element when an air flow amount within an intake pipe is changed.

FIG. 9 is a graph of the amount of change of the output characteristic of the flow amount measuring element 29 actually measured when the airflow amount within the intake pipe 11 is changed. The amount of change of the output characteristic is actually measured in cases when A2/A1=A3/A1=1 and when A2/A1=A3/A1=1.43 based on the output characteristic of the prior art (Japanese Patent Laid-Open No. Hei. 8-5430). When A2/A1=A3/A1=1, the direction of the bypass flow is changed sharply by 180° at the turning section 18b of the bypass passage 18, so that strong contraction flow is generated right after the turning section 18b due to the inertia of the flow in changing its direction, thus increasing the resistance of the flow and dropping the velocity of the bypass flow. Due to that, the output of the flow amount measuring element 29 becomes low as a whole and the flow amount measuring accuracy drops. Specifically, because the velocity of the bypass flow becomes insufficient in the low flow amount domain, the output of the flow amount measuring element 29 drops and the flow amount measuring accuracy drops remarkably there.

When A2/A1=A3/A1=1.43 however, the change of the direction of the flow at the upstream side passage 18a turning section 18b→downstream side passage 18c becomes moderate. Then, the contraction flow which is generated by the inertia of the flow right after the turning section 18b is reduced and the loss of pressure due to the friction of the inner wall faces of the turning section 18b and the downstream side passage 18c with air is reduced due to the increase of the passage sectional area. Thereby, the flow at the turning section 18b→downstream side passage 18c→outflow port 22 becomes smooth, the velocity of the bypass flow which contacts with the flow amount measuring element 29 increases more than the prior art, the output of the flow amount measuring element 29 increases as a whole more than the prior art and the flow amount measuring accuracy increases. At this time, the velocity of the bypass flow is fully maintained even in the low flow amount domain, the output of the flow amount measuring element 29 is fully maintained and a satisfactory measuring accuracy may be maintained even in the low flow amount domain.

Figure 10:
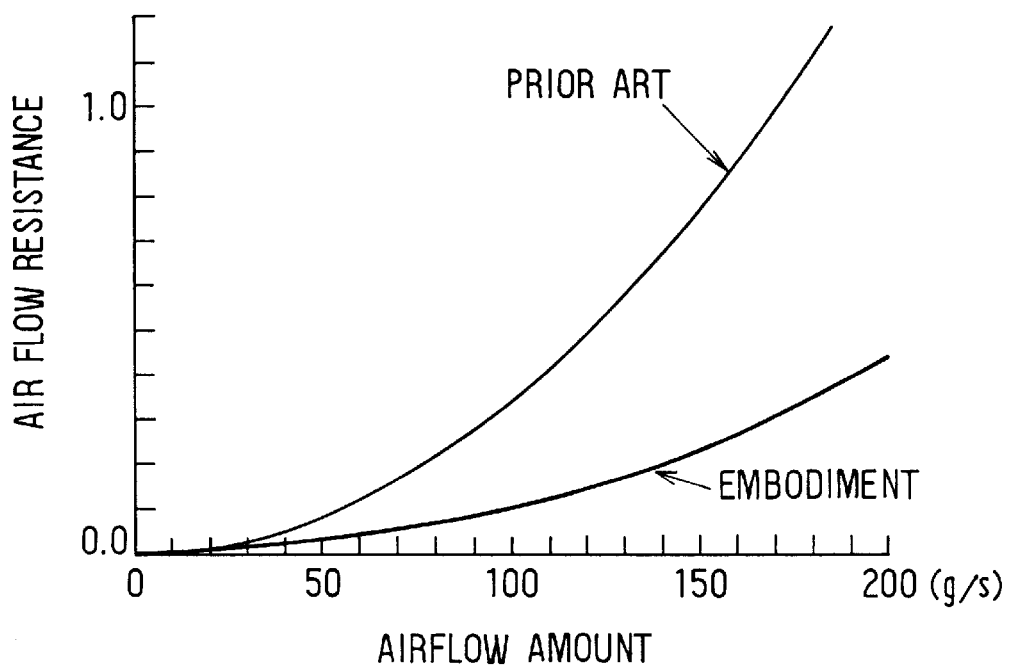
FIG. 10 is a graph showing an actually measured relationship between the airflow amount within the intake pipe and air flow resistance caused by the airflow meter.

FIG. 10 is a graph of an actually measured relationship between the airflow amount within the intake pipe 11 and the air flow resistance caused by the airflow meter 13. Because the outer diameter of the flow amount measuring member was increased to contract a passage sectional area of the intake pipe in the prior art (Japanese Patent Laid-Open No. Hei. 8-5430) to increase suction force (negative pressure) which acts on the outflow port of the bypass passage as means for increasing the velocity of the bypass flow, the air flow resistance of the intake pipe became large, dropping the intake efficiency.

To the contrary, because the velocity of the bypass flow is increased by enlarging the passage sectional area of the turning section 18b and the downstream side passage 18c of the bypass passage 18 in the present embodiment (arrangement in FIG. 6), it is not necessary to install the flow amount measuring member having such a large diameter as the prior art within the intake pipe 11. Thereby, the passage sectional area of the spot for measuring the flow amount of the intake pipe 11 may be enlarged more than that of the prior art, the air flow resistance may be reduced to about ⅓ of the prior art and the intake efficiency may be enhanced.

In the embodiment described above, the venturi tube section 16 is provided at the lower end of the flow amount measuring body 15 and the outflow port 22 of the bypass passage 18 is opened at the peripheral wall at the downstream of the venturi tube section 16, so that the suction force (negative pressure) acts effectively on the outflow port 22 of the bypass passage 18 by the high speed airflow which flows within the venturi tube section 16 and the velocity of the bypass flow may be increased also.

It is noted that the flow amount measuring body 15 is formed by a resin mold in the embodiment described above. Further, the turning section 18b is molded in the flow amount measuring body 15 on the side in which the circuit module 14 is installed utilizing the opening on the side of the circuit module 14 of the flow amount measuring body 15 as a path for pulling out the molding die. The upstream side passage 18a and the downstream side passage 18c are molded so that they extend linearly from the turning section 18b and the sectional areas of the turning section 18b and the downstream side passage 18c in the flow direction are set larger than that of the upstream side passage 18a. The opening for molding the flow amount measuring body 15 is closed by attaching the circuit module 14, thus completing the inverted U-shape passage. That is, according to the present embodiment, a concave portion is molded as the turning section 18b at one end of the bar-like flow amount measuring body 15, the upstream side passage 18a and the downstream side passage 18c are molded linearly from the concave portion into the flow amount measuring body 15 and the turning section 18b is formed by the circuit module 14 which is attached at one end of the bar-like flow amount measuring body 15. The sectional areas of the turning section 18b and the downstream side passage 18c, with respect to the flow direction, located at the downstream of the flow amount measuring spot (the spot where the flow amount measuring element 29 is installed) may be increased with the relatively simple shape which can be molded by the molding technology and it becomes possible to prevent the contraction flow at those passage parts.

It is noted that the means for causing the suction force (negative pressure) to act on the outflow port 22 of the bypass passage 18 is not confined only to the venturi tube section 16, but various structures may be adopted.

Third Embodiment

According to the third embodiment shown in FIGS. 11a and 11b, the outflow port 22 of the bypass passage 18 is opened in the direction orthogonal to the flow of air (main stream) within the intake pipe 11 and a wall 41 which is almost parallel with the main stream direction is provided on both sides of the outflow port 22 of the bypass passage 18. Thereby, an effect of whirl flow which is generated within the intake pipe 11 on the outlet flow of the bypass passage 18 is lessened and the outlet flow of the bypass passage 18 is stabilized. Further, a hood-like projection 42 is provided at the upstream of the outflow port 22 of the bypass passage 18 to let the main stream run against the projection 42 and break away to generate a negative pressure part at the downstream of the projection 42 and to let suction force to act on the outflow port 22 of the bypass passage 18 by the negative pressure part. It is noted that the outflow port 22 of the bypass passage 18 may be opened in the direction oblique to the main stream.

Fourth Embodiment

Figure 12A:
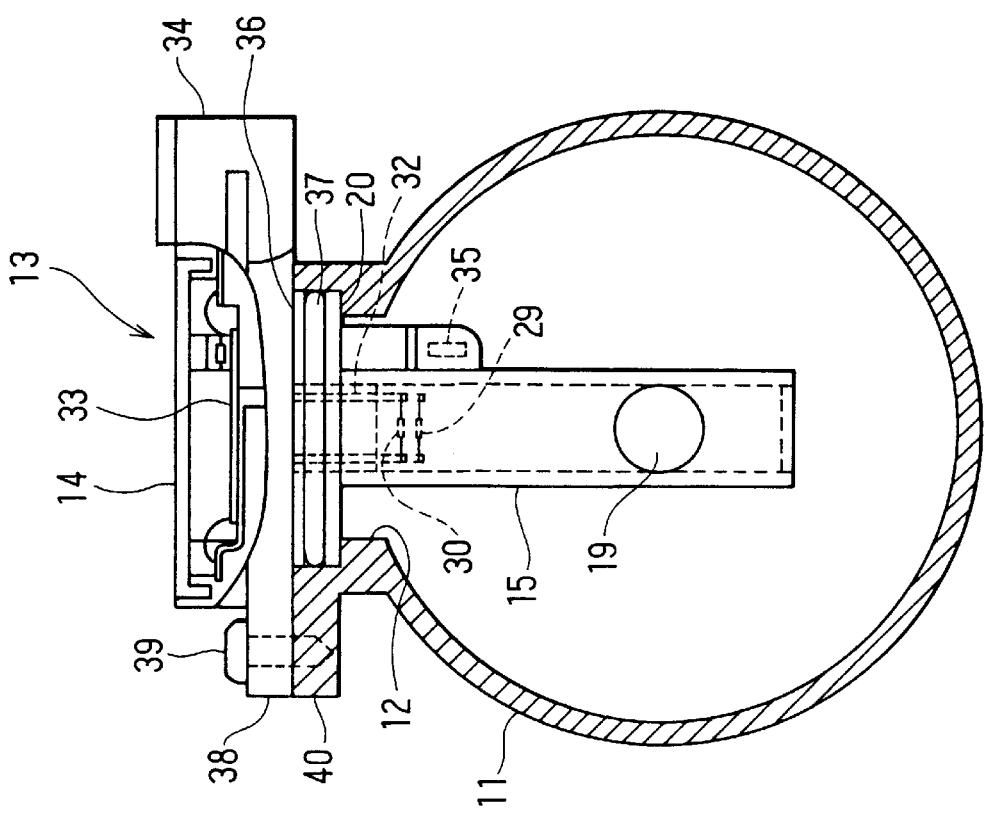
FIG. 12a is a longitudinal sectional left side view showing an assembly state of an airflow meter according to the fourth embodiment of the present invention.
Figure 12B:
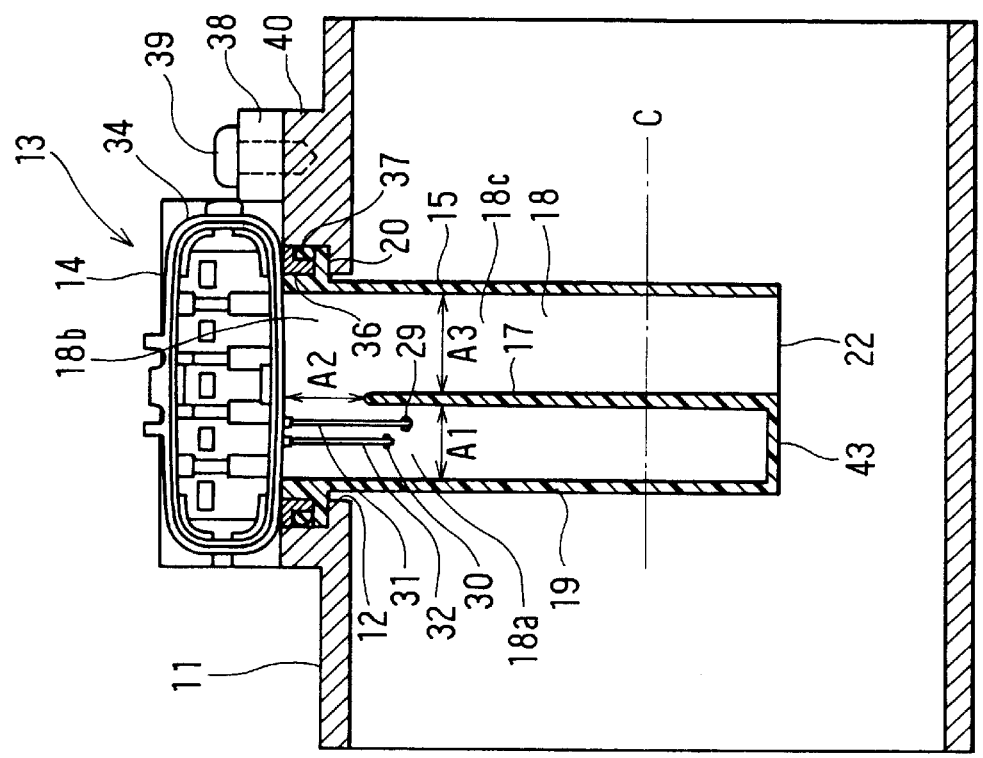
FIG. 12b is a longitudinal sectional front view thereof.

According to the fourth embodiment shown in FIGS. 12a and 12b, the outflow port 22 of the bypass passage 18 is opened in the direction orthogonal to the flow of air (main stream) within the intake pipe 11 and a lower end wall 43 of the upstream side passage 18a of the bypass passage 18 is provided in the same height with the outflow port 22 of the bypass passage 18 to let suction force (negative pressure) to act on the outflow port 22 of the bypass passage 18 by the main stream which flows along the lower end wall 43. Further, the inflow port 19 of the bypass passage 18 is positioned at the center C of the intake pipe 11 (that is, the position where the velocity of the main stream is the fastest) so that part of the main stream readily flows into the inflow port 19 of the bypass passage 18.

Fifth Embodiment

Figure 13B:
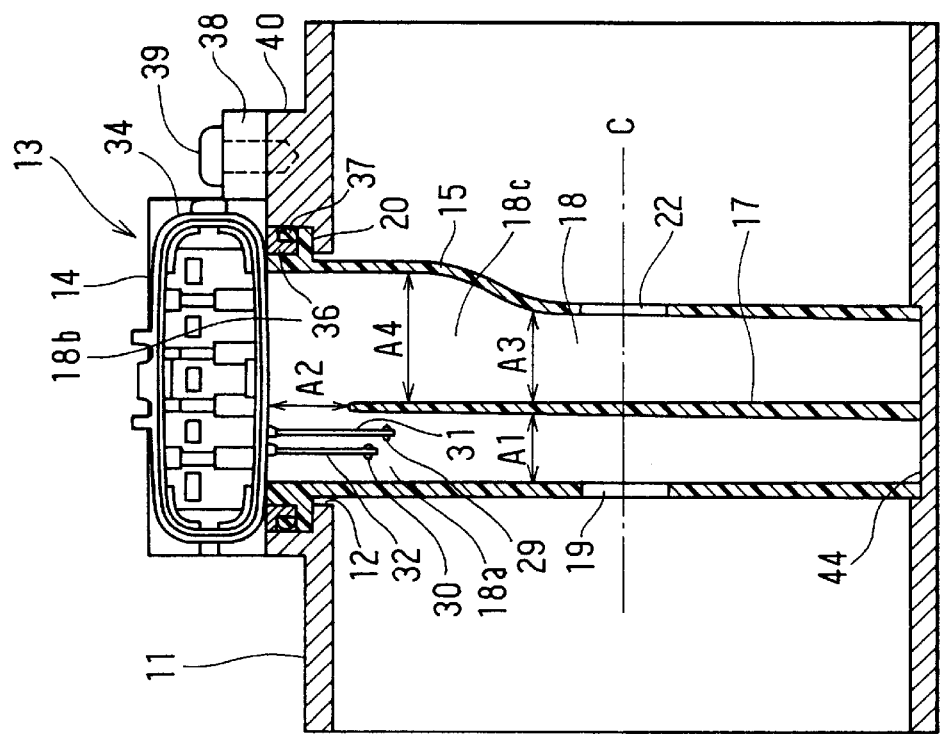
FIG. 13b is a longitudinal sectional front view thereof.
Figure 13A:
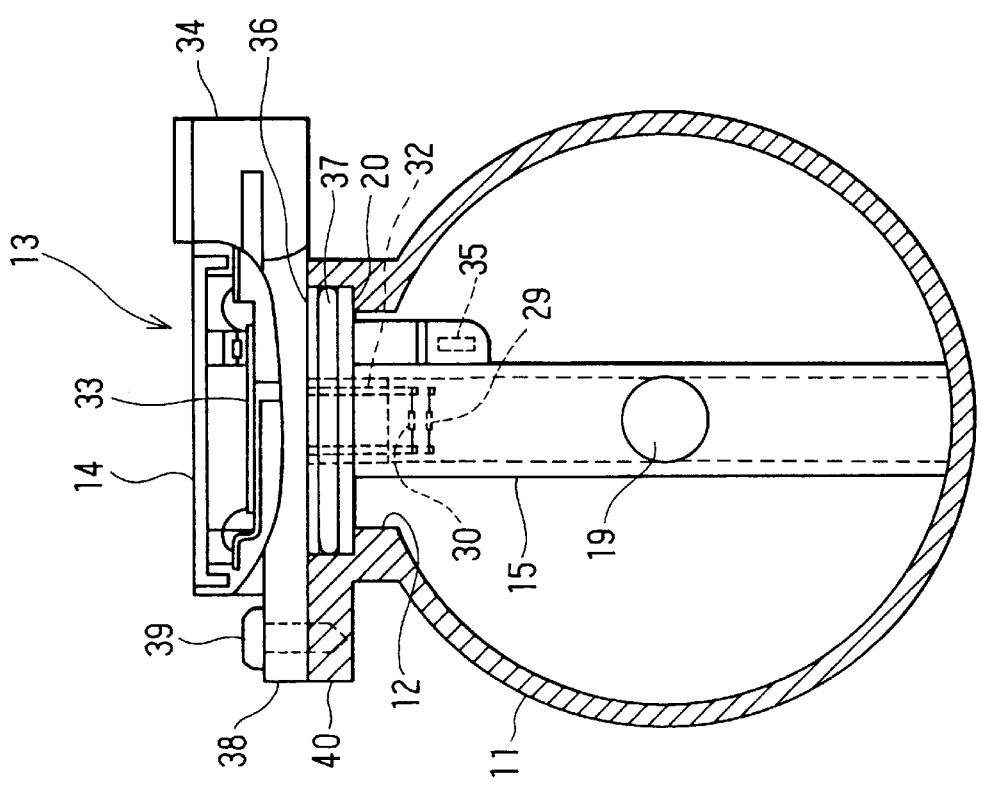
FIG. 13a is a longitudinal sectional left side view showing an assembly state of an airflow meter according to the fifth embodiment of the present invention.

Further, according to the fifth embodiment shown in FIGS. 13a and 13b, the square cylindrical flow amount measuring body 15 is extended downward such that the lower end of the flow amount measuring body 15 abuts with a counterbore 44 on the inner wall face of the intake pipe 11 to close the lower end opening of the flow amount measuring body 15 by the counterbore 44 and such that the inflow port 19 and the outflow port 22 formed on the side faces of the flow amount measuring body 15 at the upstream and downstream sides coincide with the center C of the intake pipe 11. The flow amount measuring body 15 forms the inverted U-shape bypass passage 18 in which two adjoining parallel passages 18a and 18b are linked by a turning section 18b also in this case by arranging two pipes which extend along the radial direction of the intake pipe 11 side by side along the direction of airflow and by junctioning them by the junction wall 17.

Then, a passage sectional area A4 around the boundary between the turning section 18b and the downstream side passage 18c is increased more than the passage sectional area A1 of the upstream side passage 18a and the passage sectional area A4 is reduced gradually to A3 toward the downstream. Although it is preferable to set A1<A2 and A1<A3 also in this case similarly to the foregoing embodiments described above, the contraction flow right after the turning section 18b may be reduced even if A1=A2=A3, provided that the passage sectional area A4 around the boundary between the turning section 18b and the downstream side passage 18c is increased and the passage sectional area A4 is reduced moderately toward the downstream.

According to the fifth embodiment, the change of direction of the flow becomes moderate by increasing the passage sectional area A4 around the boundary between the turning section 18b and the downstream side passage 18c and the contraction flow generated by the inertia of the flow right after the turning section 18b is reduced. Further, the contraction flow caused by the contraction of the passage sectional area may be also reduced by reducing the increased passage sectional area A4 moderately toward the downstream. It is noted that a space below the inflow port 19 of the upstream side passage 18a and a space below the outflow port 22 of the downstream side passage 18c function as surge tank chambers for attenuating the pulsation of the bypass flow.

The flow amount measuring element 29 is provided at the upstream side passage 18a to improve the flow amount measuring accuracy in view of the fact that the passage sectional area is the smallest and the velocity of the bypass flow is fastest at the upstream side passage 18a within the bypass passage 18. However, the spot where the flow amount measuring element 29 is provided is not confined only to the upstream side passage 18a, but the flow amount measuring element 29 may be provided at the downstream side passage 18c if there is a spot where the passage sectional area is small (that is, a spot where the flow velocity is fast).

It is noted that because the airflow meter 13 described above in each embodiment may be assembled by way of the plug-in method, the airflow meter 13 may be assembled very easily by providing a mounting hole of predetermined dimension not only on the intake pipe 11 but also on another member which composes part of the intake pipe such as an air cleaner and throttle body. Therefore, the airflow meter 13 may be made in common and the cost thereof may be lowered.

Beside that, the present invention is not confined only to the apparatus for measuring the intake air amount of the internal combustion engine, but may be utilized as an apparatus for measuring a flow amount of air flowing through various air ducts.

Other modifications and changes are also possible without departing from the spirit and scope of the invention.

We claim:

1. An airflow meter, comprising:
    an air duct having a mounting hole provided on a peripheral wall thereof;
    a flow amount measuring body mounted in said air duct through said mounting hole;
    a bypass passage, provided in said flow amount measuring body, for causing part of air flowing through said air duct to flow in from an inflow port provided on a side of said flow amount measuring body and to pass through said flow amount measuring body to an outflow port thereof;
    a sensor section, installed within said bypass passage, for measuring airflow amount;
    a venturi tube section, supported by said flow amount measuring body and provided almost in parallel with a direction of airflow within said air duct, for passing part of air flowing through said air duct;
    said outflow port being provided near a part of the peripheral wall of said venturi tube section where velocity of air becomes fast; and
    said venturi tube section being provided such that its length in airflow direction is equal to or smaller than a width of said flow amount measuring body in the direction of airflow within said air duct.

2. The airflow meter according to claim 1, wherein:
    said bypass passage is in an inverted U-shape within said flow amount measuring body.

3. The airflow meter according to claim 1, wherein:
    said venturi tube section has a passage enlarging section for enlarging a sectional area of the passage of said venturi tube section at part of the peripheral wall at a downstream thereof where a bypass air flow from said bypass passage joins.

4. The airflow meter according to claim 3, wherein:
    said passage enlarging section extends along a circumferential direction of said venturi tube section.

5. The airflow meter according to claim 1, wherein:

said venturi tube section has a guide section for guiding a bypass air flow toward a downstream of said venturi tube section at the outflow port of said bypass passage.

6. The airflow meter according to claim 1, wherein:

said flow amount measuring body has a flange which is to be anchored to a peripheral edge of the mounting hole at the peripheral wall of said air duct at one end thereof.

7. The airflow meter according to claim 1, wherein:

said flow amount measuring body and said venturi tube section are molded in a single body by resin by three parts of molding dies and an opening for pulling out the die provided at the end of said flow amount measuring body at the mounting side is closed by a circuit module to which said sensor section is assembled.

8. An airflow meter, comprising:

an air duct;

a bypass passage, provided within said air duct, for flowing part of air flowing through said air duct;

a sensor section installed within said bypass passage to measure flow amount of air;

a venturi tube section, installed within said air duct in parallel with a direction of airflow, for passing part of air flowing through said air duct;

said bypass passage having an outflow port provided near the part of the peripheral wall of said venturi tube section where the velocity of airflow becomes fast; and said venturi tube section having a passage enlarging section for enlarging a sectional area of the passage of said venturi tube section at a part of a peripheral wall at the downstream of said venturi tube section where the bypass flow from said bypass passage joins.

9. The airflow meter according to claim 8, wherein:

said venturi tube section is provided such that the further on the downstream side, the larger the outer diameter thereof becomes.

10. The airflow meter according to claim 8, wherein:

said venturi tube section has an inflow port provided in close vicinity with an inflow port of said bypass passage while interposing a central axis of said air duct therebetween.

11. An airflow meter for measuring an airflow amount, comprising:

an air duct;

a bypass passage provided in said duct;

a flow amount measuring element, provided within said bypass passage, for flowing in part of air flowing through said air duct; and said bypass passage being formed as an inverted U-shape passage in which two adjoining parallel passages are linked by a turning section, one passage thereof being disposed at an upstream side and the other passage thereof being disposed at a downstream side, and said turning section and said downstream side passage being formed into a shape which suppress contraction flow generated at the downstream of said turning section.

12. The airflow meter according to claim 11, wherein:

a passage sectional area around the boundary of said turning section and said downstream side passage is set larger than a passage sectional area of said upstream side passage and is changed gradually.

13. The airflow meter according to claim 11, wherein:

a passage sectional area of said downstream side passage is set larger than a passage sectional area of said upstream side passage.

14. The airflow meter according to claim 11, wherein:

the passage sectional area of said turning section is set larger than a passage sectional area of said upstream side passage.

15. The airflow meter according to claim 11, wherein:

said flow amount measuring element is provided at a spot where the passage sectional area of said bypass passage is small.

16. The airflow meter according to claim 11, wherein:

said flow amount measuring element is provided in said upstream side passage.

\* \* \* \* \*